(12) United States Patent
Sharma et al.

(10) Patent No.: US 12,143,276 B2
(45) Date of Patent: Nov. 12, 2024

(54) MACHINE LEARNING OF PATTERN CATEGORY IDENTIFICATION FOR APPLICATION COMPONENT TAGGING AND PROBLEM RESOLUTION

(71) Applicant: INTERNATIONAL BUSINESS MACHINES CORPORATION, Armonk, NY (US)

(72) Inventors: Mayank Sharma, Bangalore (IN); Anuj Gupta, Gurgaon (IN); Gaurav Kumar Arora, Greater Noida West (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/189,068

(22) Filed: Mar. 23, 2023

(65) Prior Publication Data

US 2024/0323098 A1    Sep. 26, 2024

(51) Int. Cl.
*H04L 41/16*    (2022.01)
*H04L 41/5022*    (2022.01)
*H04L 41/5054*    (2022.01)
*H04L 41/5074*    (2022.01)

(52) U.S. Cl.
CPC .......... *H04L 41/16* (2013.01); *H04L 41/5022* (2013.01); *H04L 41/5054* (2013.01); *H04L 41/5074* (2013.01)

(58) Field of Classification Search
CPC . H04L 41/16; H04L 41/5074; H04L 41/5025; H04L 41/5054
See application file for complete search history.

(56) References Cited

U.S. PATENT DOCUMENTS

| 9,697,352 B1* | 7/2017 | Armstrong .......... H04L 63/1408 |
| 10,067,760 B2 | 9/2018 | Ryali et al. |
| 10,783,453 B2* | 9/2020 | El Sayyed ............. G06Q 10/00 |

(Continued)

FOREIGN PATENT DOCUMENTS

AU    2019202728 A1    5/2019

OTHER PUBLICATIONS

"End-to-end scenario using the ITSM Automation run book," [online] BMC Software, Inc. © Copyright 2013-2020 [retrieved Oct. 21, 2022], retrieved from the Internet: <https://docs.bmc.com/docs/TruesightOrchestrationContent/201902/end-to-end-scenario-using-the-itsm-automation-run-book-869547906.html>, 3 pg.

(Continued)

*Primary Examiner* — Nam T Tran
(74) *Attorney, Agent, or Firm* — CUENOT, FORSYTHE & KIM, LLC

(57) ABSTRACT

A plurality of tickets can be received. A pattern pertaining to an issue with an application can be determined by at least one artificial neural network. The pattern can be indicated among at least a portion of the plurality of tickets. The portion of the plurality of tickets can be grouped into a group comprising a primary ticket and at least one secondary ticket. Automation steps can be accessed from a database. The automation steps can be implemented to resolve the issue for the primary ticket. Responsive to the resolving the issue by implementing the automation steps from the database for the primary ticket, the secondary ticket can be closed.

18 Claims, 8 Drawing Sheets

(56) References Cited

U.S. PATENT DOCUMENTS

| | | | |
|---|---|---|---|
| 2011/0295898 A1 | 12/2011 | Grabarnik et al. | |
| 2019/0347148 A1 | 11/2019 | Gomes Pereira et al. | |
| 2020/0065151 A1 | 2/2020 | Ghosh et al. | |
| 2020/0242623 A1* | 7/2020 | Savir | G06V 10/82 |
| 2020/0351383 A1* | 11/2020 | Jayaraman | H04L 41/5074 |
| 2020/0396144 A1* | 12/2020 | Clarke | H04L 41/5074 |
| 2021/0073653 A1 | 3/2021 | Maes | |
| 2021/0135959 A1* | 5/2021 | Ricks | H04L 41/5074 |
| 2023/0037124 A1* | 2/2023 | Mengwasser | H04L 41/5074 |

OTHER PUBLICATIONS

Muni, D.P. et al., "Recommending resolutions of ITIL services tickets using Deep Neural Network," InProceedings of the Fourth ACM IKDD Conferences on Data Sciences, Mar. 9, 2017, pp. 1-10.
"Ticket Tagging Automation to Increase Your ROI for Customer Support," [online] Iris Agent © Copyright 2021, Jun. 29, 2021, retrieved from the Internet :<https://irisagent.com/blog/ticket-tagging-automation-to-increase-your-roi-for-customer-support>, 2 pg.
Mell, P. et al., The NIST Definition of Cloud Computing, National Institute of Standards and Technology, U.S. Dept. of Commerce, Special Publication 800-145, Sep. 2011, 7 pg.

* cited by examiner

MACHINE LEARNING OF PATTERN CATEGORY IDENTIFICATION FOR APPLICATION COMPONENT TAGGING AND PROBLEM RESOLUTION

BACKGROUND

The present invention relates to support ticketing systems and, more particularly, to automated resolution of problem instances that occur in systems.

In information technology (IT), problem management is the process of identifying and managing the causes of problem incidents on an IT service. IT Service Management (ITSM) Frameworks oftentimes are used for problem management. ITSM frameworks are a collective of processes and practices used to manage and support IT services. A component of ITSM frameworks are processes for resolving IT problem instances. Such processes typically involve assignment of tickets to problem instances. The tickets are used to guide the problem instances through to resolution.

SUMMARY

A method includes receiving a plurality of tickets. The method also can include determining, by at least one artificial neural network, a pattern pertaining to an issue with an application, the pattern indicated among at least a portion of the plurality of tickets. The method also can include grouping the at least the portion of the plurality of tickets into a group comprising a primary ticket and at least one secondary ticket. The method also can include accessing automation steps from a database. The method also can include resolving the issue for the primary ticket by implementing the automation steps from the database. The method also can include responsive to the resolving the issue by implementing the automation steps from the database for the primary ticket, closing the secondary ticket.

A system includes a processor programmed to initiate executable operations. The executable operations include receiving a plurality of tickets. The executable operations also can include determining, by at least one artificial neural network, a pattern pertaining to an issue with an application, the pattern indicated among at least a portion of the plurality of tickets. The executable operations also can include grouping the at least the portion of the plurality of tickets into a group comprising a primary ticket and at least one secondary ticket. The executable operations also can include accessing automation steps from a database. The executable operations also can include resolving the issue for the primary ticket by implementing the automation steps from the database. The executable operations also can include responsive to the resolving the issue by implementing the automation steps from the database for the primary ticket, closing the secondary ticket.

A computer program product includes a computer readable storage medium having program code stored thereon. The program code is executable by a data processing system to initiate operations. The operations include receiving a plurality of tickets. The operations also can include determining, by at least one artificial neural network, a pattern pertaining to an issue with an application, the pattern indicated among at least a portion of the plurality of tickets. The operations also can include grouping the at least the portion of the plurality of tickets into a group comprising a primary ticket and at least one secondary ticket. The operations also can include accessing automation steps from a database. The operations also can include resolving the issue for the primary ticket by implementing the automation steps from the database. The operations also can include responsive to the resolving the issue by implementing the automation steps from the database for the primary ticket, closing the secondary ticket.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
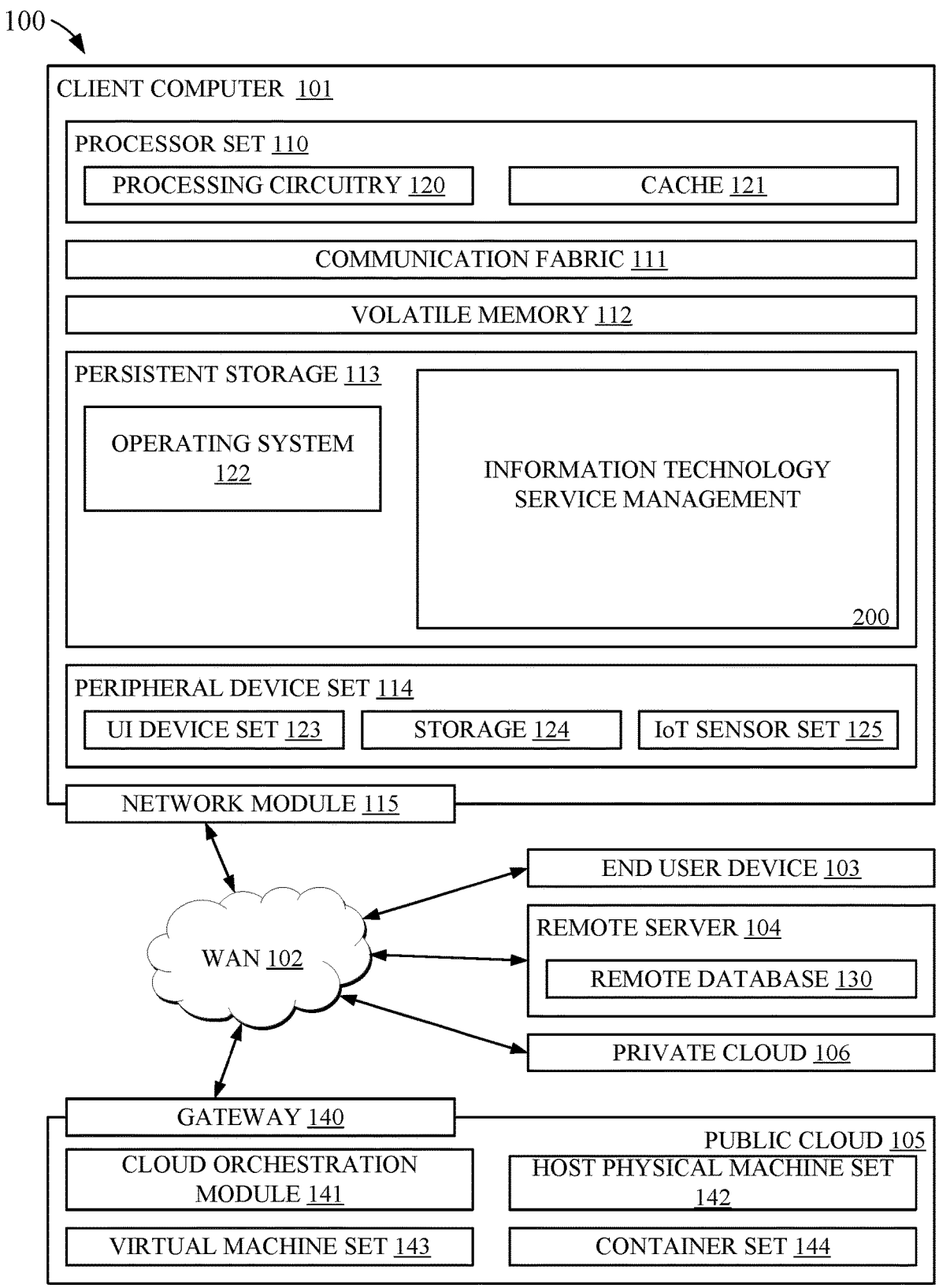
FIG. 1 is a block diagram illustrating an example of a network data processing system.

This disclosure relates to support ticketing systems and, more particularly, to automated resolution of problem instances that occur in systems.

The arrangements described herein are directed to computer technology, and provide an improvement to computer technology. Specifically, the present arrangements utilize machine learning to improve automatic handling of information technology support tickets (hereinafter "tickets") and automatic resolution of issues, such as problem instances, reported by the tickets.

In accordance with the arrangements described herein, tickets can be received by an information technology service management (ITSM) system. Using models comprising artificial neural networks (ANNs) trained using machine learning, the ITSM system can identify a pattern among a plurality of the tickets. The pattern can indicate that the plurality of tickets pertain to the same issue, even though the symptoms of that issue indicated among the tickets may be different. For example, a ticket may indicate a network problem instance (e.g., low data rate), a ticket may indicate a database problem instance (e.g., a database query stopped unexpectedly), a ticket may indicate an application problem instance (e.g., unable to access data), and a ticket may indicate a storage problem instance (e.g., storage is full). Based on that pattern of problem instances, a determination can be made that the tickets all pertain to the same issue. Accordingly, the ITSM system can assign the tickets a group. In the group, one of the tickets can be assigned to be a primary ticket and the other tickets in the group can be assigned to be secondary tickets.

The ITSM system can implement automated steps to resolve the issue for the primary ticket, and determine whether resolving the issue for the primary ticket resolved the issue for the secondary tickets. If not, the ITSM system can implement additional automated steps to resolve the issue for the secondary tickets.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as information technology service management (ITSM) system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
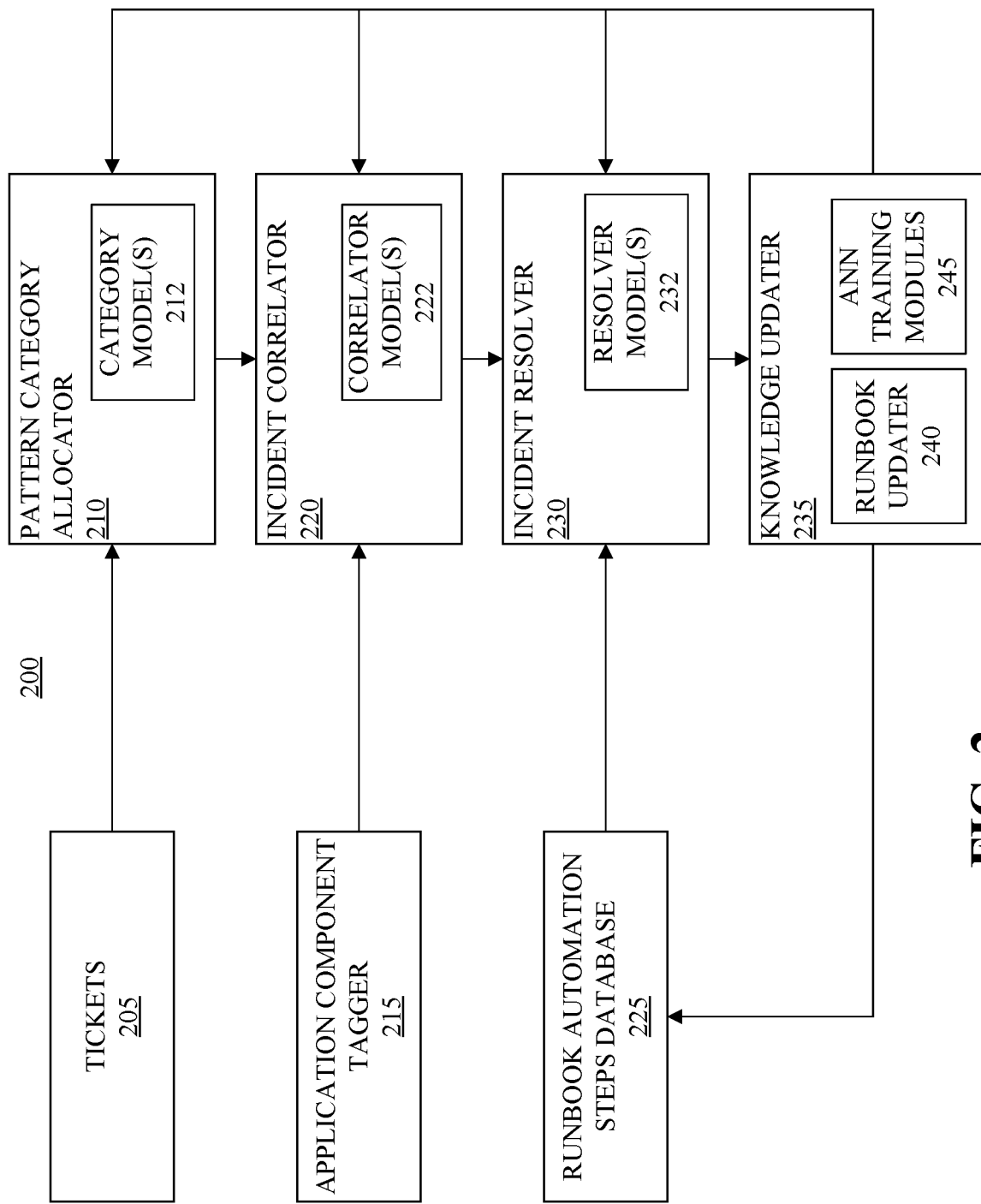
FIG. 2 is a block diagram illustrating an example architecture for an information technology service management (ITSM) system.

FIG. 2 is a block diagram illustrating an example architecture for ITSM system 200. ITSM system 200 can implement ITSM system 200 can receive tickets 205 and load tickets 205 into a pattern category allocator 210. Pattern category allocator 210 can include a relational database into which tickets 205 are stored. Tickets 205 can include a plethora of data pertaining to information technology (IT) problem instances. Examples of such data include, but are not limited to, a customer identifier, an incident date, an application for which the ticket pertains, a description of an IT problem instance, other applications that may be used, hardware being used, network resources being used, peripherals being used, etc.

Pattern category allocator 210 can include one or more category models 212, each comprising an artificial neural networks (ANN) trained using machine learning, to tag tickets 205, predict routing of tickets 205, and assign priorities to tickets 205. Use of category model(s) 212 by incident correlator 220 provide several improvements over prior known processes.

For example, category model(s) 212 can improve automated ticket tagging. In this regard, category model(s) 212 can utilize Natural Language Processing (NLP) to analyze the text of a ticket 205 and, based on that analysis, automatically apply relevant tags to the ticket 205. Examples of tags include, but are not limited to, "technical problem," "storage issue," "application issue," "database issue," "network issue," "invoice issue," etc. The use of tags can facilitate automatic categorization of tickets 205 into groups, and can help agents quickly find and prioritize tickets 205 that require their attention.

Category model(s) 212 also can improve predictive ticket routing. In this regard, category model(s) 212 can be trained, using machine learning algorithms processing past (e.g., historical) ticket data, to predict to which team or agent a new ticket 205 should be assigned based on content of the ticket 205 and the history of similar tickets. This can reduce the amount of time it takes to assign a new ticket 205 to the correct team or agent, and thus improve first contact resolution rates.

Further, category model(s) 212 also can improve intelligent prioritization of tickets 205. In this regard, category model(s) 212 can be trained to determine priorities for various tickets 205, and assign the determined priorities to tickets 205. The assigned priorities can indicate which tickets 205 are most urgent or require the most attention. This can help prioritize tickets 205 in the queue and ensure that the most critical issues are addressed first. The priorities assigned to tickets 205 can be based, at least in part, on priorities assigned by application component tagger 215 to components associated with applications.

In cases in which a high volume of tickets 205 are received, open tickets 205 having low priority could be prone to becoming stale. To prevent this, in one or more arrangements, category model(s) 212 can increase the priority level of open tickets 205 based, at least in part, on a duration of time from when the tickets 205 were received and the present time. By way of example, category model(s) 212 can evaluate how long tickets 205 have been open, overall ticket 205 volume, and ticket 205 processing rates. Based on such evaluations, category model(s) 212 can selectively increase priorities of certain tickets 205 to ensure that such tickets 205 are processed in a timely manner.

Application component tagger 215 can identify and store technology relation data in a relational database, which may be referred to as a knowledge base. In illustration, application component tagger 215 can identify components of an application and hardware infrastructure components associated with the application components. A subject matter expert and/or application architect can provide data points and/or automated discovery tools which application component tagger 215 can use for application component and infrastructure component identification and association. Based on the application component and infrastructure component identification and association, application component tagger 215 can assign priorities for each component associated with the application. Such priorities can be used by pattern category allocator 210 to assign priorities to tickets 205 pertaining to the components.

ITSM system 200 can include an incident correlator 220. Incident correlator 220 can include one or more correlator models 222, each comprising an ANN trained using machine learning, to assign tickets 205 to groups. In this regard, using correlator models 222, incident correlator 220 can analyze tickets 205 in real time and, based on the analysis, determine one or more patterns among tickets 205. Based on the determined pattern(s), incident correlator 220 can assign tickets 205 to ticket groups. Tickets 205 assigned to the same group may have a common resolution. Thus, resolving the issue for one of the tickets 205 in the group may resolve the issue for all of the tickets 205 assigned to that group. In illustration, for each ticket group, incident correlator 220 can identify a ticket 205 as a primary ticket for a ticket group. For a ticket group, incident correlator 220 also can identify one or more additional tickets 205 as secondary tickets.

Thus, a ticket group can include a primary ticket and one or more secondary tickets. Tickets 205 in a ticket group may report different problem instances, but each problem instance may pertain to the same IT issue.

The analysis implemented by correlator model(s) 212 to assign tickets 205 to groups can utilize data provided by application component tagger 215. In illustration, based on the description of an IT problem incident, incident correlator 220 can access application component tagger 215 to identify an application component corresponding to the IT problem incident, hardware corresponding to the IT problem incident, network infrastructure corresponding to the IT problem incident, etc. If the analysis indicates that a plurality of tickets 205 pertain to the same IT issue, incident correlator 220 can assign the tickets 205 to the same ticket group.

ITSM system 200 can include a runbook automation (RA) steps database 225. RA steps database 225 can store data defining automated actionable steps that may be implemented to resolve IT issues. Each group of steps defined for resolving a particular IT issue can be assigned a unique runbook identifier. A subject matter expert and/or application architect define various actionable steps which may be implemented for various IT issues.

ITSM system 200 can include an incident resolver 230. Incident resolver 230 can comprise, for example, a script base automated process configured to solve (e.g., fix) IT issues and close the tickets 205 assigned to such IT issues. For example, incident resolver 230 can solve an IT issue corresponding to a ticket group by implementing automated actionable steps in RA steps database 225 defined to resolve that IT issue. In response to solving an IT issue, incident resolver can close the primary ticket and secondary tickets in the corresponding ticket group, and communicate to owners of those tickets 205 notifications indicating that the IT issue is resolved. Incident resolver also can receive from the ticket owners feedback regarding ticket resolution.

Incident resolver 230 also can include one or more resolver models 232, each comprising an ANN trained using machine learning, to analyze sentiments of customer feedback for tickets 205. This can help identify patterns in customer satisfaction or dissatisfaction, and provide information that teams can use to take proactive steps to address issues before they escalate. In this regard, integration of machine learning and resolver models 232 into the ticket resolution process can enable teams to work more efficiently and to provide better customer experiences.

ITSM system 200 can include a knowledge updater 235. Knowledge updater 235 can update RA steps database 225 to update the automated processes defined therein to improve incident resolution. In illustration, if automated processes implemented by incident resolver 230 do not solve an IT issue, and manual intervention is used to resolve the IT issue, knowledge updater 235 can refine existing processes defined in the RA steps database 225 and/or add additional processes in the RA steps database 225 to include steps implemented by the manual intervention that resolved the IT issue.

Knowledge updater 235 can include a runbook updater 240. Runbook updater 240 can update runbook automation steps database 225 with various data pertaining to ticket resolution. Such data can include, for example, information indicating whether steps specified by runbook automation steps database 225 are successful at resolving one or more incidents, changes made to steps in runbook automation steps database 225 to resolve incidents, etc.

Knowledge updater 235 also can include ANN training modules 245 configured to train models 212, 222, 232 to improve their respective processes. In illustration, ANN training modules 245 can train models 212, 222, 232 to improve predictive ticket routing, improve automated ticket tagging, improve intelligent ticket prioritization, and improve sentiment analysis used to automatically determine customer feedback for tickets.

Figure 3:
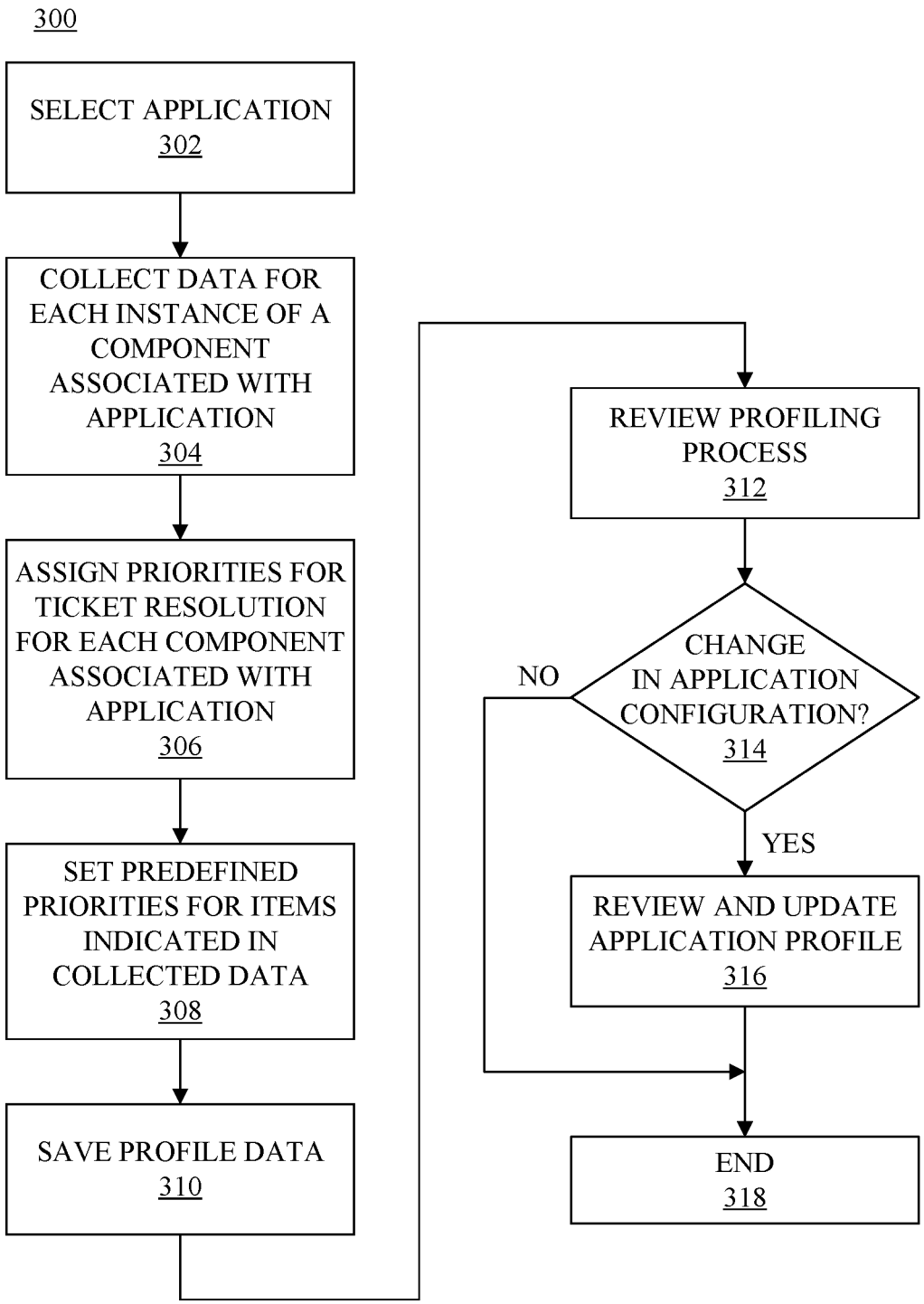
FIG. 3 is a flowchart illustrating an example of a method of tagging application components.

FIG. 3 is a flowchart illustrating an example of a method 300 of tagging application components. Method 300 can be implemented by ITSM system 200. Method 300 can be implemented for each of a plurality of applications which ITSM system 200 supports.

At step 302 application component tagger 215 can select an application.

At step 304 application component tagger 215 can collect data for each instance of a component associated with the application. Examples of such data can include, but not limited to, the application name, names of one or more databases used by the application, a name of a virtual machine hosting the application, and a network server name, etc.

At step 306 application component tagger 215 can assign priorities for ticket resolution for each component associated with the application. For example: application component tagger 215 can assign storage as highest (e.g., primary) priority if problem incidents are reported on the application, problem incidents are reported on a database used for the application, problem incidents are reported on performance of the application, and problem incidents are reported on storage used for the application; application component tagger 215 can assign database as highest (e.g., primary) priority if problem incidents are reported on the application, problem incidents are reported on performance of the application, and problem incidents are reported on a database used for the application, but problem incidents are not reported on storage used for the application; and application component tagger 215 can assign application as highest (e.g., primary) priority if problem incidents are reported on the application and problem incidents are reported on performance of the application, but problem incidents are not reported for the databased nor storage used for the application. Still, any collection of problem incidents can be used to determine which application components are to be assigned highest priority and the present arrangements are not limited in this regard.

At step 308 application component tagger 215 can assign predefined priorities for items indicated in the collected data. For example, a virtual machine can be assigned a highest priority (e.g., priority=1), storage can be assigned a second highest priority (e.g., priority=2), database can be assigned a third highest priority (e.g., priority=3), application can be assigned a fourth highest priority (e.g., priority=4), and so on. The predefined priorities can be used by pattern category allocator 210 to assign priorities to tickets 205, for example as previously described.

At step 310 application component tagger 215 can save application profile data for the application, for example in a data table named APP_PROFILE. The application profile data can include the data collected at step 304, the priorities assigned at step 306, and the priorities assigned at step 308. The application profile data also can include any other data pertinent to the application, and the present arrangements are not limited in this regard.

At step 312 the profiling process can be reviewed. In one or more arrangements, a subject matter expert can review the profiling process, though the present arrangements are not limited in this regard. For example, application component tagger 215 can include one or more models trained, using machine learning, to analyze the profiling process and revise the profile data.

At decision box 314, if there is a change in a configuration of the application, at step 316 the application profile can be reviewed and updated, and at step 318 the process can end. In one or more arrangements, a subject matter expert can review and update the application profile. If there is not a change in the configuration of the application, the process can proceed from decision box 314 to step 318 and the process can end.

Figure 4:
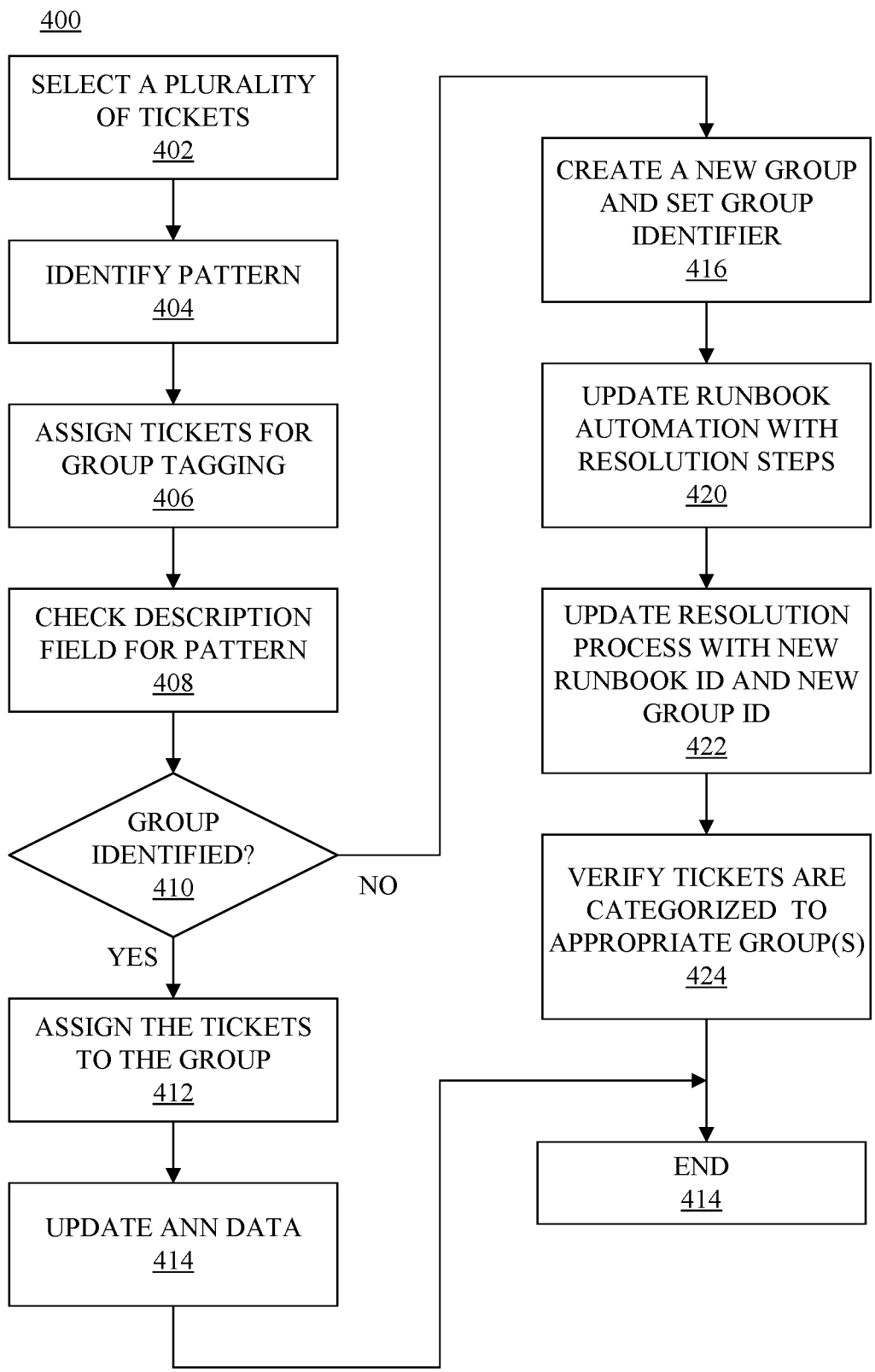
FIG. 4 is a flowchart illustrating an example of a method of grouping information technology support tickets.

FIG. 4 is a flowchart illustrating an example of a method 400 of grouping information technology support tickets. Method 400 can be implemented by ITSM system 200. Method 400 can be implemented by ITSM system 200. Method 400 can be implemented for each of a plurality of tickets received by ITSM system 200.

At step 402 incident correlator 220 can select a plurality of tickets 205 stored in the relational database maintained by pattern category allocator 210. Incident correlator 220 can implement an automated ticket alert process to select tickets 205. The automated ticket alert process can select tickets 205 based, at least in part, on priorities assigned to tickets 205 by pattern category allocator 210. By way of example, assume tickets 205 are assigned priorities from 1 to 5, with 1 being highest priority and 5 being lowest priority. Incident correlator 220 can select tickets 205 having a priority of 5 for processing. After processing such tickets 205, incident correlator 220 can select new tickets 205 that have been assigned a priority of 5, but if no new tickets 205 have been assigned that priority, incident correlator can processing tickets 205 having a priority of 4, and so on.

At step 404 incident correlator 220 can determine whether there is pattern indicated among at least a portion of the selected tickets and, if so, identify the pattern. In illustration, correlator model(s) 212 can determine a pattern pertaining to an issue with an application, wherein the pattern is indicated among at least a portion of a plurality of tickets 205. In illustration, if a first ticket pertains to an issue with a particular system (e.g., a particular application), and one or more other tickets pertaining to that same particular system (e.g., that particular application) and is/are received within threshold period of time of when the first ticket is received, such circumstance can be identified as an attribute of a pattern. If two or more tickets indicate the same system identifier and/or application, such circumstance can be identified as an attribute of a pattern. If two or more tickets pertain to components for an application that are functionally related, for instance database, storage, disk, input/output functionality, etc., such circumstance can be identified as an attribute of a pattern. Other pattern attributes can be identified and the present arrangements are not limited in this regard.

At step 406, if a pattern among tickets is identified, incident correlator 220 can assign the tickets with that pattern to be processed using group tagging.

At step 408 incident correlator 220 can check a description field of the database of pattern category allocator 210 to determine whether there is an existing group for the identified pattern.

Referring to decision box 410, if there is an existing group for the identified pattern, at step 412 the tickets assigned for group tagging can be assigned to that existing group. For example, a ticket can be assigned to a storage group, a database group, an application group, a network group, etc.

At step 414 knowledge updater 235 can update data used to train models 212, 222, 232 with information pertaining to the ticket assignment.

Referring again to decision box 410, if there is not an existing group for the identified pattern, the process can proceed to step 416. At step 416 incident correlator 220 can create a new group for the tickets assigned for group tagging and set a group identifier. For example, each of those tickets can be assigned the group identifier with a sequence number, wherein each combination of the group identifier and a sequence number is unique to a particular ticket. The first ticket of the group that was received can be assigned as the primary ticket, and the other tickets of the group can be assigned as secondary tickets. At step 420 incident correlator 220 can update RA steps database 225 with resolution steps for the IT issue pertaining to the tickets assigned to the new group.

For example, since there is not an existing group for the identified pattern, the incident pattern may be unique. Accordingly, a new group and resolution process steps may be created for that incident pattern. Incident correlator 220 can automatically create the new group and a corresponding RA steps for the resolution process steps based on an analysis of the identified pattern by correlator model(s) 212. In one or more arrangements, a subject matter expert can review the crated group and resolution process, and revise them if prudent. In one or more arrangements, the new group and RA steps can be held from being released until the subject matter expert approves them.

At step 422 incident correlator 220 can update RA steps database 225 to assign one or more identifiers to the runbook steps for resolving the IT issue pertaining to the tickets assigned to the new group. For example, the group identifier set for the new group can be assigned to those runbook steps, and a new runbook identifier can be assigned to those resolution steps.

At step 424 correlator model(s) 212 can verify that each of the selected plurality of tickets are categorized to the appropriate group(s). In one or more non-limiting arrangements, step 424 can be performed by a subject matter expert.

The process can end at step 414.

Figure 5A:
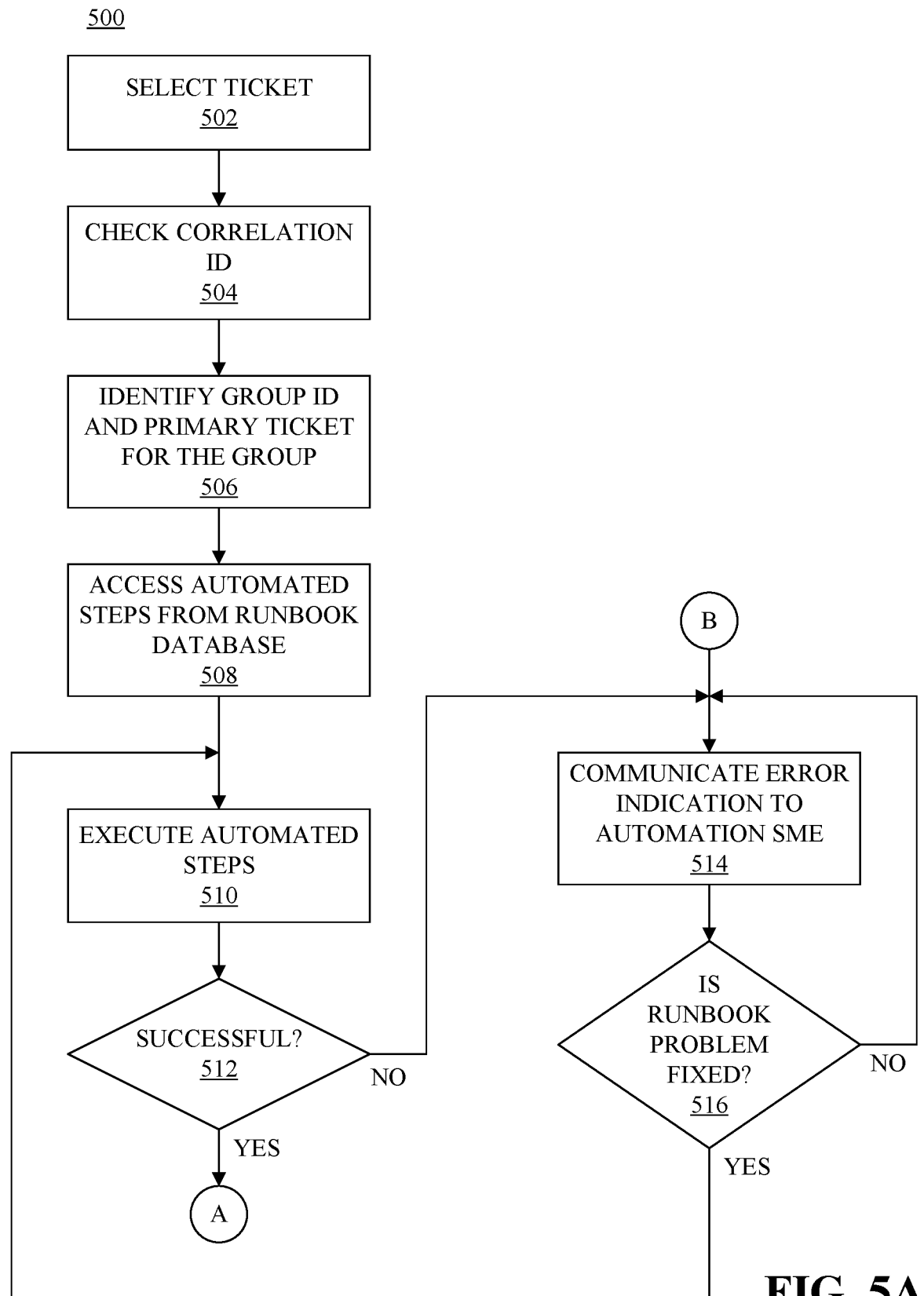
FIGS. 5A and 5B, together, are a flowchart illustrating an example of a method of incident correlation and incident resolution.
Figure 5B:
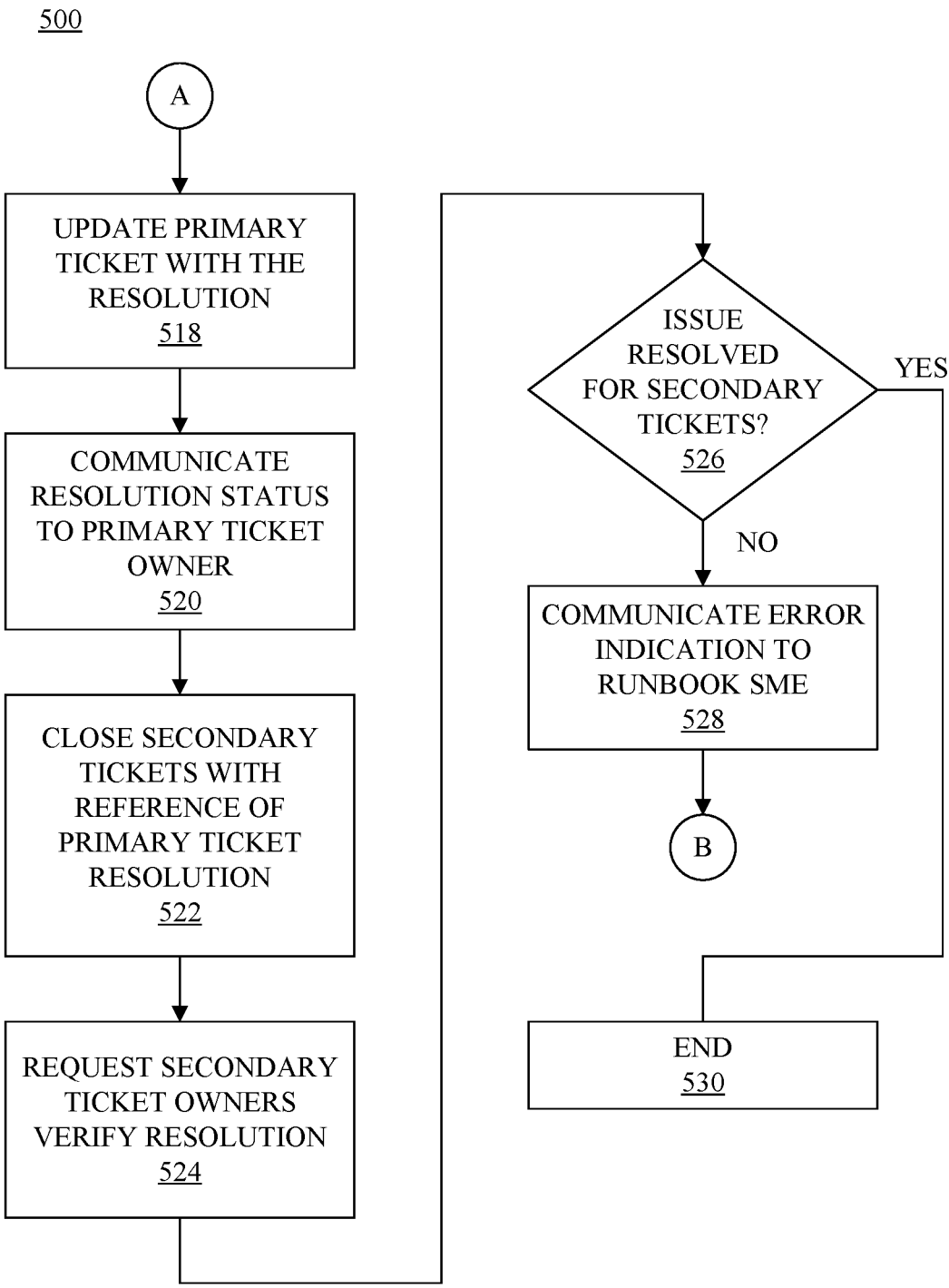

FIGS. 5A and 5B, together, are a flowchart illustrating an example of a method 500 of incident correlation and incident resolution. Method 500 can be implemented by ITSM system 200. Method 500 can be performed on a plurality of open tickets.

At step 502 incident correlator 220 can select a ticket.

At step 504 incident correlator 220 can check a correlation identifier for the ticket. The correlation identifier can be an identifier indicating a relation between the group identifier and corresponding runbook steps. By way of example, the correlation identifier can indicate a referential integrity relation between the a table of the RA steps database 225 and the group identifier.

At step 506, if the ticket is assigned to a group, incident correlator 220 can identify the group identifier and the primary ticket for that group.

At step 508 incident resolver 230 can access from RA steps database 225 automated steps assigned to the group for resolving the IT issue for which the ticket was submitted.

At step 510 incident resolver 230 can execute the automated steps.

At decision box 512 incident resolver 230 can determine whether the automated steps were successful at resolving the issue. If not, at step 514 incident resolver 230 can communicate an error indication to an automation subject matter expert. The error indication can be communicated in a message, for example a text message, an e-mail, a chatbot message, or any other message suitable for communicating error information. The automation subject matter expert can update the automated steps assigned to the group in the RA steps database 225.

At decision box 516 incident resolver 230 can determine whether the automated steps in the RA steps database 225 have been fixed. In illustration, incident resolver 230 can monitor RA steps database 225 to identify updates/changes committed in RA steps database 225 to the automated steps assigned the group. If a fix for the automated steps for the group in the RA steps database 225 have not been identified within a threshold period of time, the process can return to step 514 and the error code can again be communicated to the automation subject matter expert. Step 514 and decision box 516 can iterate until a fix for the automated steps for the group in the RA steps database 225 is detected.

Responsive to determining that the automated steps for the group in the RA steps database 225 have been fixed, the process can return to step 510 and iterate until at decision box 512 incident resolver determines that the automated steps were successful at resolving the issue. In response to successfully executing the automated steps to resolve the issue, the process can proceed to step 518.

At step 518 incident resolver 230 can update the primary ticket with the resolution of the issue. For instance, incident resolver 230 can update the primary ticket with an indication that the issue is resolved and the runbook identifier for the runbook steps used to resolve the issue.

At step 520 incident resolver 230 can communicate a resolution status to the owner of the primary ticket for the group. The resolution status can indicate that the issue reported by the ticket is resolved. For instance, incident resolver 230 can communicate a message to the owner of the primary ticket. The message can be, for example, a text message, an e-mail, a chatbot message, or any other message suitable for communicating resolution status information.

At step 522 incident resolver 230 can close the secondary tickets for the group. Incident resolver 230 can add closing data to the secondary tickets referencing the primary ticket and the primary ticket resolution.

At step 524 incident resolver 230 can request secondary ticket owners verify whether the issue, as described by the problem incidents in the secondary tickets, is resolved. For instance, incident resolver 230 can communicate a message to owners of the secondary tickets. Again, the message can be, for example, a text message, an e-mail, a chatbot message, or any other message suitable for communicating resolution status information.

At decision box 526 incident resolver 230 can determine whether the issue is resolved for the secondary tickets. For instance, the message communicated to the secondary ticket owners can prompt the secondary ticket owners to provide a first response to incident resolver 230 if the issue they reported is resolved and provide a second response to incident resolver 230 if the issue they reported is not resolved.

If the issue is not resolved for any of the secondary tickets, at step 528 incident resolver 230 can communicate an error indication to a runbook subject matter expert. The error indication can be communicated in a message, for example a text message, an e-mail, a chatbot message, or any other message suitable for communicating error information. The runbook subject matter expert verify the documented runbook steps and revise such steps. The process then can return to step 514 and iterate until the issue is resolved for the primary ticket and the secondary tickets.

Referring again to decision box 526, responsive to the issue being resolved for the secondary tickets, at step 530 the process can end.

Figure 6:
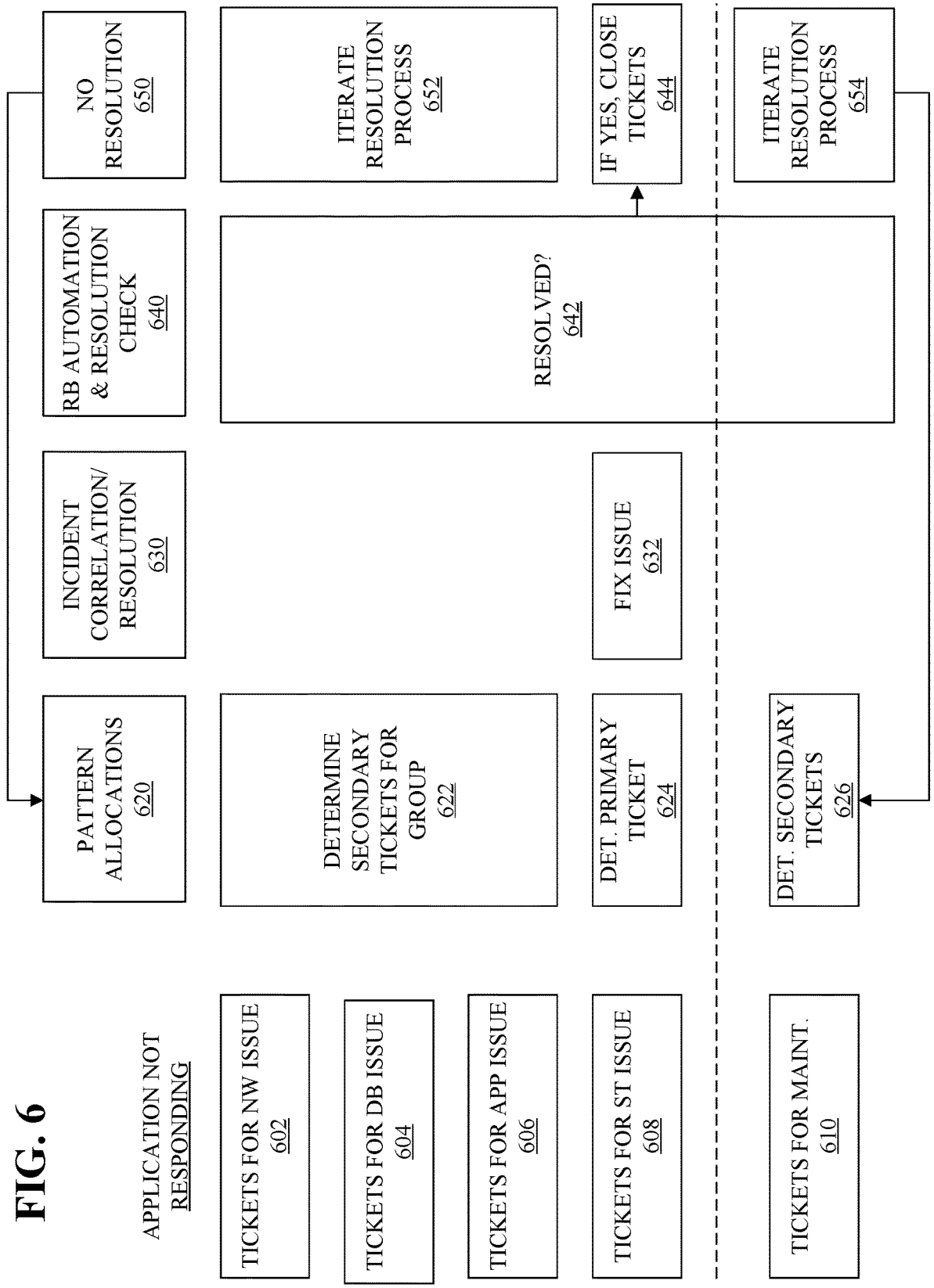
FIG. 6 is a flow diagram illustrating an example processing information technology support tickets.

FIG. 6 is a flow diagram illustrating an example of ITSM system 200 processing information technology support tickets.

ITSM system 200 can receive a plurality of tickets for issues related to an application not responding. For example, the following types of tickets can be received: tickets 602 for network issues; tickets 604 for database issues; tickets 606 for application issues; and tickets 608 for storage issues. ITSM system 200 also can receive tickets 610 for system/application maintenance pertaining to the issue (e.g., weekend maintenance to be performed).

At step 620 pattern category allocator 210 can perform pattern allocations to determine tickets for a group based on their patterns, for example in accordance with method 400 of FIG. 4. For example, at step 622 tickets 602, 604, 606 can be determined to be secondary tickets for a group and at step 624 ticket 608 can be determined to be a primary ticket for the group. Ticket 608 can be determined to the primary ticket for the group based on the priority of the application/component to which ticket 608 pertains. For example, ticket 608 can pertain to a storage issue, and storage can be assigned higher priority than a network, a database and an application.

Tickets 610 for maintenance can pertain to the issue to which the tickets 602-608 pertain, and can be submitted to perform maintenance that may be desired. For instance, tickets 610 can pertain to enabling new services to prevent future occurrences of the issue, disabling services no longer required, deleting code/data made redundant or deprecated by resolution of the issue, etc. Accordingly, at step 626 tickets 610 can be determined to be secondary tickets for the group.

Pattern category allocator 210 can update a status tool in ITSM system 200 to indicate grouping status of tickets 602-610. Pattern category allocator 210 also can notify chatbots associated with tickets 602-610. For example, tickets 602-610 can be submitted via chatbots and, via the chatbots, submitters of tickets 602-610 can check resolution status of tickets 602-610.

At step 630 incident resolver 230 can implement incident correlation and incident resolution to resolve the issue to which tickets 602-608 pertain, for example in accordance with steps 502-510 of method 500 of FIGS. 5A and 5B. Accordingly, at step 632 the issue can be fixed for the primary ticket 608.

At step 640 incident resolver 230 can implement a runbase automation and resolution check, for example in accordance with steps 512-530 of method 500 of FIGS. 5A and 5B. Accordingly, at step 642 incident resolver 230 can determine whether the issue is resolved for each of the tickets 602-608.

If the incident resolution solved the issue with the primary ticket 608 and secondary tickets 602-606, at step 644 incident resolver 230 can close primary ticket 608 and secondary tickets 602-606.

At step 650, if the issue with each of the tickets 602-608 is not resolved, at step 654 incident resolver 230 can iterate the resolution process, for example in accordance with method 500.

The flow diagram of FIG. 6 can be implemented without human intervention unless a subject matter expert is summoned by method 500. Nonetheless, through training of RA steps database 225 by knowledge updater 235, ITSM system 200 will be trained to require no human intervention to resolve ticket issues.

At a time for which maintenance is to be performed in accordance with tickets 610, the process can return to steps 640, 642 to determine whether the issue is resolved for the tickets 610. If so, at step 644 incident resolver 230 can close tickets 610. If, however, at step 650 incident resolver determines the issue was not resolved for tickets 610, at step 652 incident resolver 230 can iterate the resolution process for tickets 610, for example in accordance with method 500.

Figure 7:
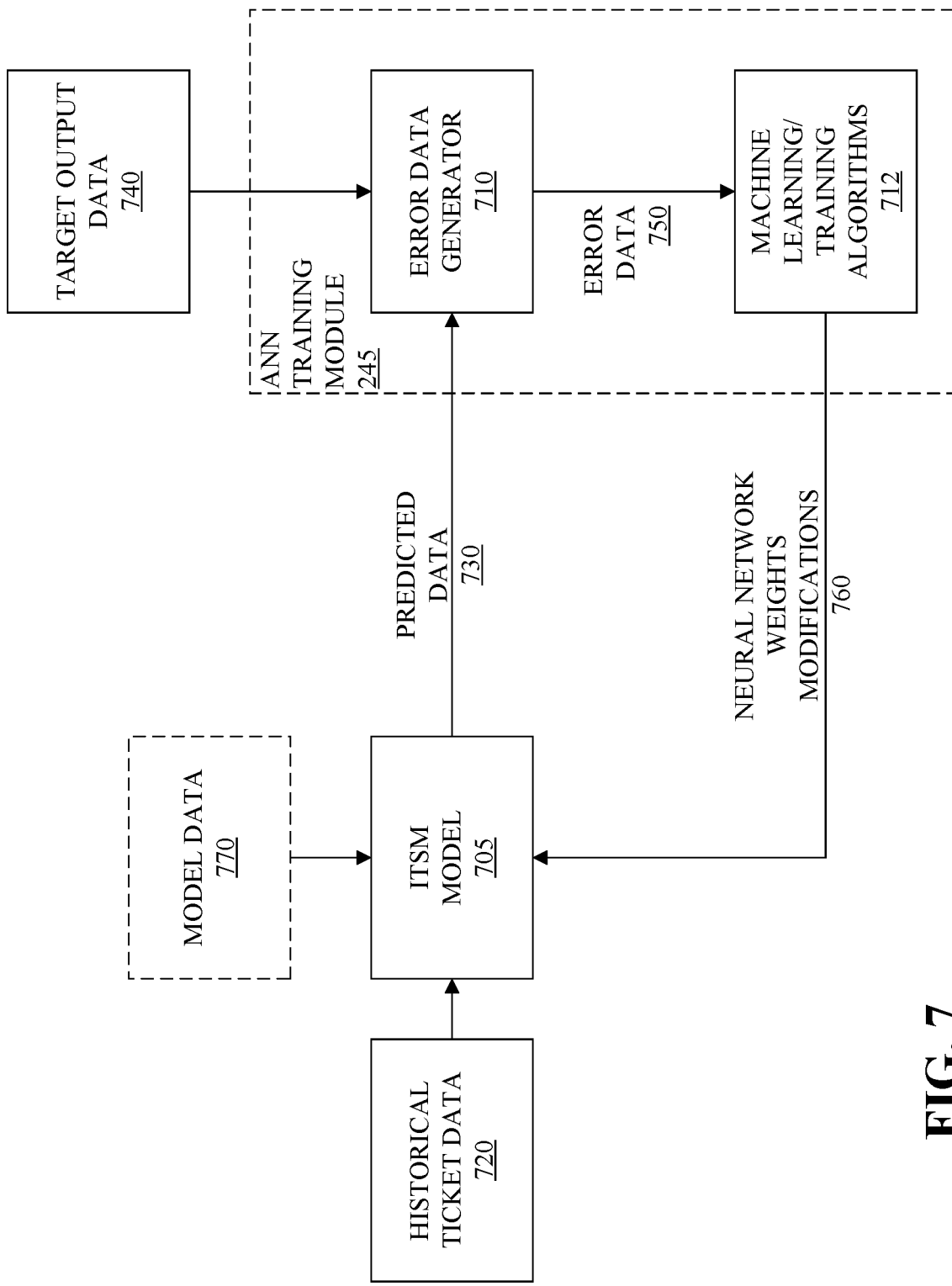
FIG. 7 depicts a block diagram illustrating machine training of an example information technology service management model according to an embodiment of the present invention.

FIG. 7 depicts a block diagram illustrating machine training of an example ITSM model 705 according to an embodiment of the present invention. A category model 212, a correlator model 222 and a resolver model 232 each are an example of an ITSM model 705. A respective ITSM model 705 can be trained by a respective ANN training module 245.

ANN training module 245 can include error data generator 710 and machine learning/training algorithms 712 configured to train ITSM models 705, such as category model(s) 212, correlator model(s) 222 and resolver model(s) 232 described herein. ITSM model 705 can receive, as input training data for machine learning, historical ticket data 720. Historical ticket data 720 can include both structured and unstructured data. The structured data can include, for example, ticket tagging data, ticket grouping data, ticket priority data, ticket routing data, data indicating automated steps to resolve issues to which tickets pertain, etc.

Unstructured data can include results of performing natural language processing (NPL) on natural language data, for example information documented in tickets, feedback received from ticket owners regarding resolution of tickets, etc. In one or more arrangements, knowledge updater 235 can include a NLP module that processes text and/or audio to generate unstructured data. In one or more arrangements, knowledge updater 235 can utilize another system or service to processes text and/or audio to generate unstructured data, and knowledge updater 235 can receive the unstructured data from that system or service.

ITSM model 705 can process historical data 720 using ITSM algorithms and generate predicted data 730 based on such processing. Error data generator 710 can compare predicted data 730 to target output data 740, and generate error data 750 indicating differences between predicted data 730 and to target output data 740. Machine learning/training algorithms 712 can process the error data 750 and, based on such processing, generate neural network weights modifications 760. Machine learning/training algorithms 712 can modify coefficients of the ANN of the ITSM model 705 using the neural network weights modifications 760, in a process known as machine learning (or training). In addition to the historical data 720, model data 770 generated by the trained ITSM model 705 (e.g., as predicted distribution data 730) can be provided as input to the ITSM model 705 during training of the ITSM model 705.

The machine learning process can iterate until an objective is satisfied. Such objective can be, for example, generation of error data 750 having one or more values below one or more threshold values, the objective can be to iterate the machine learning process a threshold number of times, or the objective can be to iterate the machine learning process a threshold duration of time. Moreover, the machine learning process can be iterated in response to additional historical data 720 being acquired. Accordingly, processing of tickets 205 can improve over time.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including." "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including." "comprises," and/or "comprising." when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement." "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting." depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "ticket" means an information technology support ticket indicating an issue pertaining to an application to be resolved or maintenance to be performed for the application.

As defined herein, the term "processor set" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving a plurality of tickets;
   determining, by at least one artificial neural network, a pattern pertaining to an issue with an application, the pattern indicated among at least a portion of the plurality of tickets;
   collecting data for a plurality of components associated with the application;
   assigning respective priorities for ticket resolution for the plurality of components associated with the application, wherein the respective priorities assigned to at least two of the plurality of components associated with the application are different;
   grouping the at least the portion of the plurality of tickets into a group comprising a primary ticket and at least one secondary ticket;
   accessing automation steps from a database;
   resolving the issue for the primary ticket by implementing the automation steps from the database; and
   responsive to the resolving the issue by implementing the automation steps from the database for the primary ticket, closing the secondary ticket.

2. The method of claim 1, further comprising:
   determining whether the pattern corresponds to an existing group; and
   responsive to determining that the pattern does not correspond to the existing group, creating the group as a new group.

3. The method of claim 2, further comprising:
   updating the automation steps in the database with resolution steps for the new group.

4. The method of claim 1, further comprising:
   communicating a message to an owner of the secondary ticket requesting the owner to verify whether the issue, as described in the secondary ticket, is resolved.

5. The method of claim 4, further comprising:
   responsive to the owner of the secondary ticket indicating that the issue is not resolved, communicating an error indication to a subject matter expert.

6. The method of claim 1, further comprising:
   setting predefined priorities for respective items indicated in the data collected for the application.

7. A system, comprising:
   at least one processor programmed to initiate executable operations comprising:
   receiving a plurality of tickets;
   determining, by at least one artificial neural network, a pattern pertaining to an issue with an application, the pattern indicated among at least a portion of the plurality of tickets;
   collecting data for a plurality of components associated with the application;
   assigning respective priorities for ticket resolution for the plurality of components associated with the application, wherein the respective priorities assigned to at least two of the plurality of components associated with the application are different;
   grouping the at least the portion of the plurality of tickets into a group comprising a primary ticket and at least one secondary ticket;
   accessing automation steps from a database;
   resolving the issue for the primary ticket by implementing the automation steps from the database; and
   responsive to the resolving the issue by implementing the automation steps from the database for the primary ticket, closing the secondary ticket.

8. The system of claim 7, the executable operations further comprising:
   determining whether the pattern corresponds to an existing group; and
   responsive to determining that the pattern does not correspond to the existing group, creating the group as a new group.

9. The system of claim 8, the executable operations further comprising:
   updating the automation steps in the database with resolution steps for the new group.

10. The system of claim 7, the executable operations further comprising:
    communicating a message to an owner of the secondary ticket requesting the owner to verify whether the issue, as described in the secondary ticket, is resolved.

11. The system of claim 10, the executable operations further comprising:
    responsive to the owner of the secondary ticket indicating that the issue is not resolved, communicating an error indication to a subject matter expert.

12. The system of claim 7, the executable operations further comprising:
   setting predefined priorities for respective items indicated in the data collected for the application.

13. A computer program product, comprising:
   one or more computer readable storage mediums having program code stored thereon, the program code stored on the one or more computer readable storage mediums collectively executable by a data processing system to initiate operations including:
   receiving a plurality of tickets;
   determining, by at least one artificial neural network, a pattern pertaining to an issue with an application, the pattern indicated among at least a portion of the plurality of tickets;
   collecting data for a plurality of components associated with the application;
   assigning respective priorities for ticket resolution for the plurality of components associated with the application, wherein the respective priorities assigned to at least two of the plurality of components associated with the application are different;
   grouping the at least the portion of the plurality of tickets into a group comprising a primary ticket and at least one secondary ticket;
   accessing automation steps from a database;
   resolving the issue for the primary ticket by implementing the automation steps from the database; and
   responsive to the resolving the issue by implementing the automation steps from the database for the primary ticket, closing the secondary ticket.

14. The computer program product of claim 13, wherein the program code is executable by the data processing system to initiate operations further comprising:
   determining whether the pattern corresponds to an existing group; and
   responsive to determining that the pattern does not correspond to the existing group, creating the group as a new group.

15. The computer program product of claim 14, wherein the program code is executable by the data processing system to initiate operations further comprising:
   updating the automation steps in the database with resolution steps for the new group.

16. The computer program product of claim 13, wherein the program code is executable by the data processing system to initiate operations further comprising:
   communicating a message to an owner of the secondary ticket requesting the owner to verify whether the issue, as described in the secondary ticket, is resolved.

17. The computer program product of claim 16, wherein the program code is executable by the data processing system to initiate operations further comprising:
   responsive to the owner of the secondary ticket indicating that the issue is not resolved, communicating an error indication to a subject matter expert.

18. The computer program product of claim 13, wherein the program code is executable by the data processing system to initiate operations further comprising:
   setting predefined priorities for respective items indicated in the data collected for the application.

* * * * *